Sept. 12, 1939.　　　F. THOMPSON　　　2,172,994
BASIN-FORMING DEVICE
Filed Oct. 15, 1937　　　2 Sheets-Sheet 1
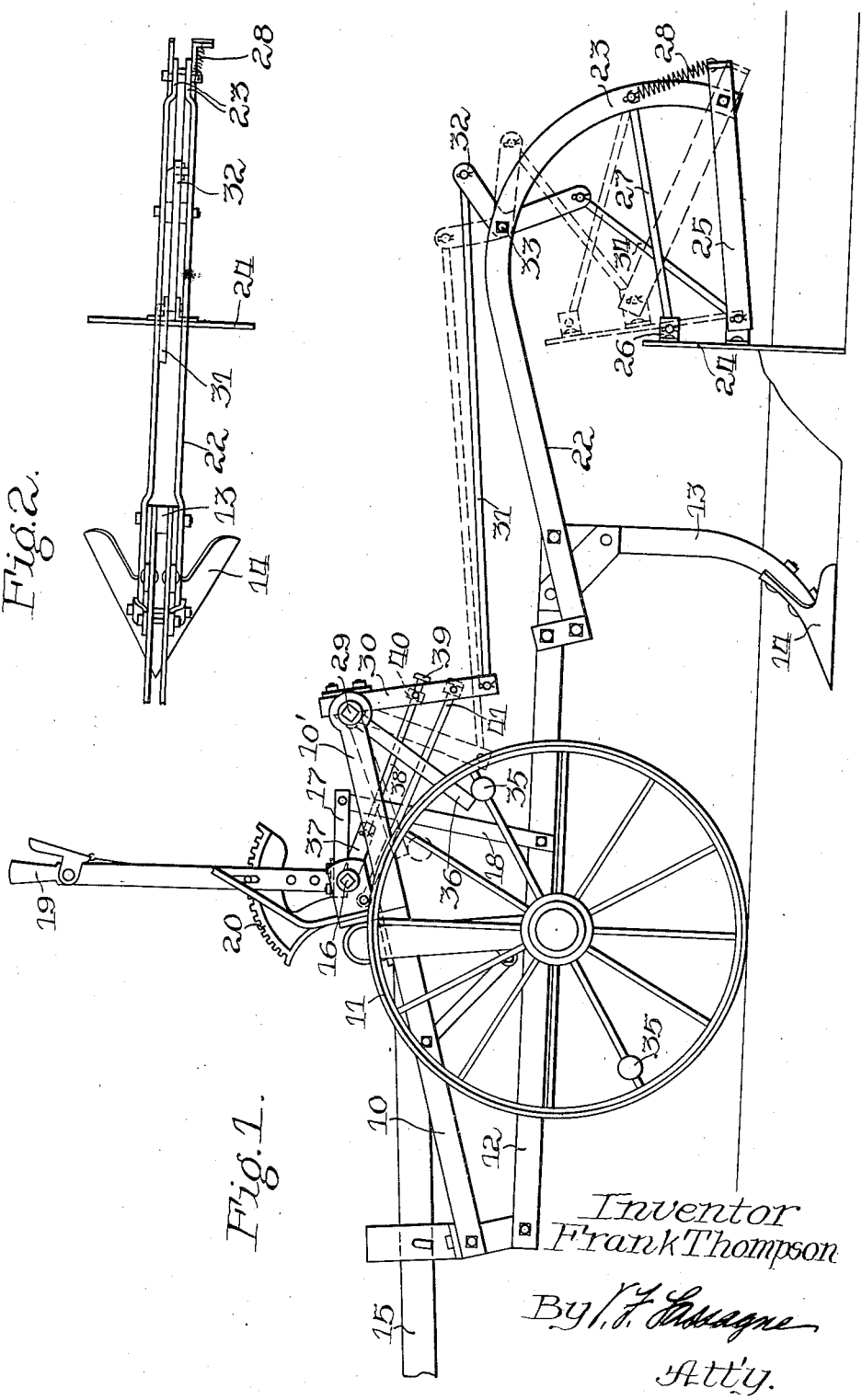
Inventor
Frank Thompson
By [signature]
Att'y.

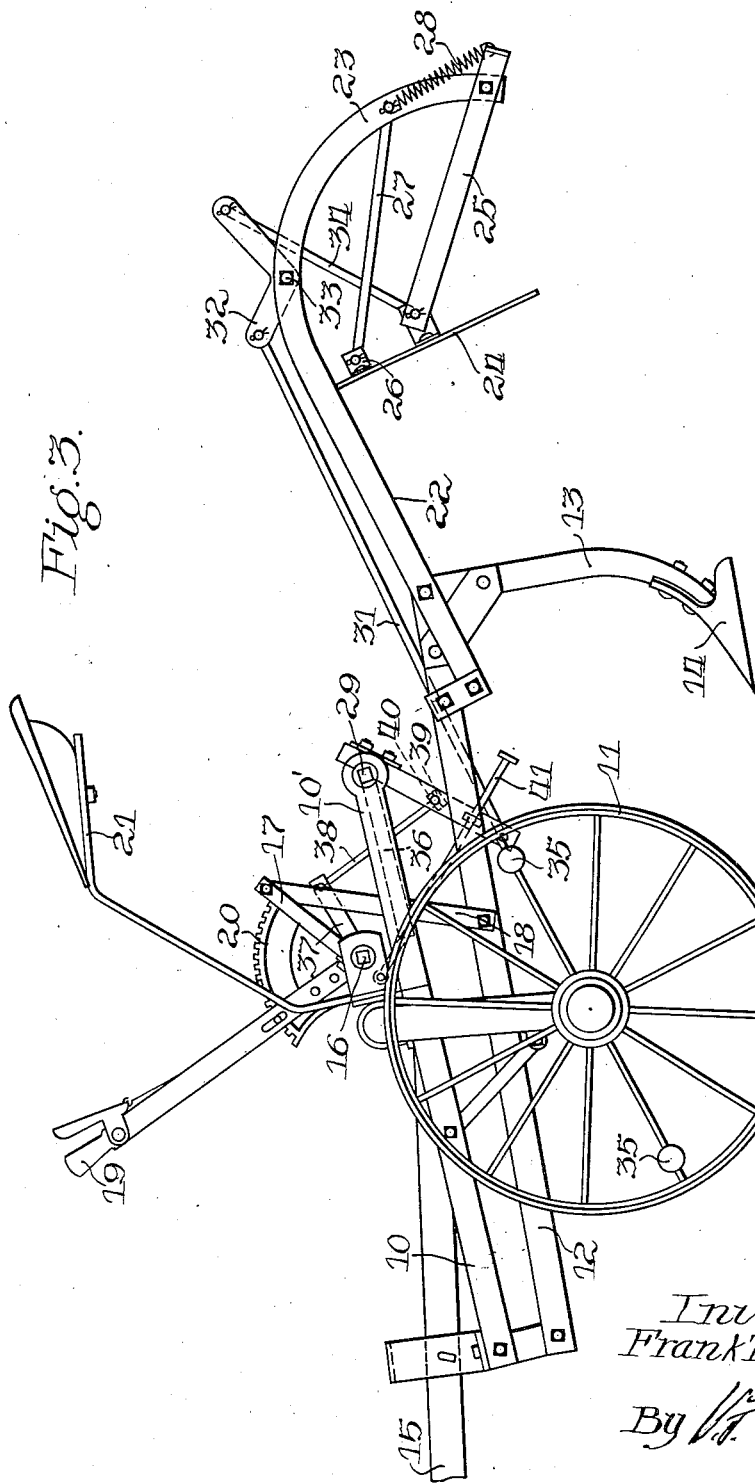

Patented Sept. 12, 1939

2,172,994

UNITED STATES PATENT OFFICE 2,172,994

BASIN-FORMING DEVICE

Frank Thompson, Hamilton, Ontario, Canada, assignor to International Harvester Company of Canada, Limited, Hamilton, Ontario, Canada Application October 15, 1937, Serial No. 169,211

11 Claims. (Cl. 97—55)

This invention relates to a basin forming device and more particularly to a device for attachment to a wheeled frame and adapted to be operated at intervals by said wheels.

As is well known to those skilled in the art, basin forming devices have become more or less common construction characterized by the operation of a basin forming shovel traveling behind a furrow forming tool in the furrow formed thereby. These basin forming attachments are ordinarily connected to a wheeled frame or vehicle and are controlled by means on the wheel or other power means for forming basins at intervals. Inasmuch as the basin forming device is controlled by forward travel of the vehicle to which it is attached, it is necessary that the device may be operated in such a manner that the upward travel of the device, after the basin is formed, will be upwardly and rearwardly from the basin, so as not to upset or destroy the mounds of soil collected to form the dams between the basins. It is also important that means be provided for raising the dam forming device to transport position and at the same time automatically disengaging operation of the device from the means controlling it.

The principal object of the invention, then, is to provide a basin forming device and means for operating the same in a manner to lift the basin forming shovel, or tool, upwardly and rearwardly from the ground.

Another object is to provide means for connecting the dam forming device behind an ordinary agricultural implement without materially altering the structure of the implement.

Another object is to provide a connection between the lift mechanism for the implement and the operating mechanism for the basin forming device whereby both may be simultaneously lifted to transport position.

Still another object is to provide interconnecting means between the lifting and operating mechanisms for automatically disengaging the operating mechanism when the basin forming device is in transport position.

Still another object is to provide means on the wheels of the agricultural implement for operating lifting and lowering mechanism for the basin forming device.

And specifically, another object is to provide for the attachment of the lifting and lowering means to a wheeled frame or agricultural implement, said lifting and lowering means including means operated by one of said wheels and linkage connected to the basin forming shovel in a manner providing for lifting of the shovel in a direction upwardly and rearwardly with respect to the basin formed by the device.

Briefly, these and other objects may be achieved by a construction which includes a beam connected to and extending rearwardly from an ordinary type field cultivator. A basin forming shovel is movably carried by the beam and is adapted to travel behind the furrow forming tool of the cultivator. Lifting and lowering means for the basin forming shovel is operated by means on a wheel of the cultivator. Suitable means, preferably in the form of parallel linkage, is provided between the beam and the shovel for permitting the shovel, when lifted, to be raised upwardly and rearwardly with respect to the ground and cultivator frame. It will be understood, of course, that this brief description refers to a preferred and ideal embodiment of the invention.

A further and more complete understanding of the objects and desirable features of the invention may be had from the following detailed description taken in conjunction with the accompanying sheets of drawings, in which:

Figure 1 is a general side elevational view showing the preferred type of basin forming device connected to a wheeled cultivator, and indicating in dotted lines a raised position of the shovel and operating linkage;

Figure 2 is a partial plan view illustrating the relationship between the cultivator shovel and the basin forming shovel; and, Figure 3 is a view similar to Figure 1, showing the cultivator shovel and basin forming shovel raised in transport position.

As previously mentioned, an ideal adaptation of the basin forming device is in conjunction with an ordinary type field cultivator generally comprising a cultivator frame 10 carried on wheels 11. A cultivator beam 12 is pivotally carried at the forward end of the frame 10 on a transverse axis. The rearward end of the beam 12 rigidly carries a standard 13, at the lower end of which is a furrow forming tool or cultivator shovel 14 of any conventional type. The frame 10 includes a draft member 15, which may be connected to a tractor or any other form of motive power, not shown. Lifting and lowering mechanism is provided for raising the shovel 14 from the ground. This mechanism includes a transverse rock-shaft 16 rockably carried on the frame 10 and rigidly carrying a rearwardly extending crank arm 17, which is pivotally connected by a link 18 to the cultivator beam 12. A hand lever 19 is secured to the rock-shaft 16 and cooperates with a quadrant 20 for adjusting the depth of and for lifting and lowering the shovel 14. An operator's station or seat 21 is located on the cultivator frame in a position from which the hand lever 19 may be easily controlled.

A rearwardly extending beam 22 is connected at its forward end to the rear end of the cultivator beam 12. This beam 22 extends rearwardly and is curved downwardly, as at 23, to provide for movably mounting a basin forming shovel 24 by means of a link or arm 25 pivotally connected at opposite ends between the shovel and the beam and comprising part of a substantially parallel linkage arrangement. This shovel 24 is disposed rearwardly of the cultivator shovel 14 and is adapted to travel in the furrow formed thereby. In its downward position, the shovel 24 accumulates mounds of soil to form dams between the basins, as is well understood by those skilled in the art. The shovel 24 is provided with an ear 26 spaced above the pivotal connection between the shovel and the arm 25. A link 27 is pivotally connected to the ear 26 and to the beam 23 at a point spaced above the pivotal connection between the beam and the arm and comprising another part of the aforesaid parallel linkage arrangement. The link 27 tends to hold the shovel 24 upright while the shovel is in its lowered position. Resilient means in the form of a coil spring 28 is connected between the beam 23 and the extreme end of the arm 25, to aid in maintaining the downward position of the shovel 24.

The lifting and lowering, or operating, means for the basin forming device will now be described. At opposite sides, the cultivator frame 10 is provided with extensions 10', only one of which is shown, for supporting a transverse rock-shaft 29. A downwardly and slightly rearwardly extending arm 30 is rigidly carried by the rock-shaft. An actuating link 31 is pivotally connected at one end to the arm 30, and at the other end is pivotally connected to one arm of a bell crank 32 pivotally carried by the beam 23 at 33. A link 34 is pivotally connected at one end to the other arm of the bell crank 32, and at the other end is associated with the basin forming shovel 24 by being pivotally connected thereto at the point of pivotal connection between the shovel and the arm 25.

Means are provided for rocking the rock-shaft 29 to actuate the lifting and lowering means for the basin forming device. A preferred construction provides for the use of a pair of diametrically opposed lugs 35 secured to the spokes of the wheel 11. An actuating arm 36 is rigidly carried by the rock-shaft 29 and extends forwardly and downwardly into the circular path of the lugs 35. From the foregoing description, it will be seen that the basin forming shovel 24 is raised and lowered once for every 180° revolution of the wheel 11 as the lugs 35 engage the actuating arm 36, as indicated in Figure 1 by dotted lines. It will be further noted from the dotted line showing that the link 27 between the beam 23 and the shovel 24 confines movement of the upper end of the shovel to an arc having as its radius the length of said link. In this manner, the upper end of the shovel 24 is prevented from extreme rearward movement with respect to the cultivator frame 10, which results in considerable rearward movement of the lower portion of the shovel as the shovel moves upwardly from the basin. In this manner, it will be seen that the shovel is lifted cleanly away from the dam formed in the basin and the dam is thereby left intact and is not upset forwardly in the furrow. This provision in the structure constitutes an important feature of the invention, as it is desirable to maintain the height of the dams between the basins.

The following description pertains to the interconnecting means between the lifting and lowering means for the cultivator and the lifting and lowering or operating means for the basin forming device whereby both may be simultaneously lifted to transport position and operation of the basin forming device automatically interrupted. This interconnecting means includes an arm 37 rigidly carried by the rock-shaft 16. A link 38, having a head 39, is pivotally connected at one end to the arm 37, and at the other end it slidably cooperates with a pivot block 40 in the arm 30. By the provision of this interconnecting means, when the hand lever is moved forwardly, the head 39 on the link 38 engages the pivot block 40 on the arm 30 and the actuating arm 36 is thus drawn out of the circular path of the lugs 35 simultaneously with the raising of the cultivator beam 12, as shown in Figure 3. This provision is made to prevent operation of the basin forming device while it is raised to transport position.

To prevent disengagement between the actuating arm 36 and the lugs 35, while the basin forming device is in lowered position, a link 41 is provided between the cultivator frame 10 and the arm 30. This link 41 limits rearward movement of the arm 30 and consequently downward and rearward movement of the arm 36, thus preventing the arm 36 from passing rearwardly out of the circular path of the lugs 35.

From the construction described above, it will be apparent that an improved basin forming device has been provided and also that a simple and positive operating means has been adapted thereto. As hereinbefore stated, the above description pertains to a preferred construction, and it will be appreciated that numerous alterations and modifications may be made therein without departing from the spirit and scope of the invention as defined in the appended claims.

What is claimed is:

1. In combination with a wheeled frame, a basin forming device comprising a beam carried by the frame, a basin forming tool movably carried by the beam, lifting and lowering means operatively associated with the tool, and means connected between the tool and the beam for moving the tool rearwardly with respect to forward travel of the frame while being lifted.

2. In combination with a wheeled frame having a furrow forming tool thereon, a basin forming device comprising a beam carried by the frame and extending rearwardly therefrom, a basin forming tool movably carried by the beam rearwardly of the furrow forming tool and in longitudinal alinement therewith, said basin forming tool being thereby adapted to follow in said furrow, lifting and lowering means operatively associated with the basin forming tool, and means connected between the basin forming tool and the beam for moving said basin forming tool rearwardly with respect to forward travel of the frame while being lifted.

3. In combination with a wheeled frame, a basin forming device comprising a beam carried by the frame, a basin forming tool movably carried by the beam, lifting and lowering means carried by the frame and operatively connected to said tool, means on an aforesaid wheel for operating said lifting and lowering means at intervals, and means connected between the tool and the beam for moving the tool rearwardly with respect to forward travel of the frame while being lifted.

4. In combination with a wheeled frame having a furrow forming tool thereon, a basin forming device comprising a beam carried by the frame and extending rearwardly therefrom, a basin forming tool movably carried by the beam rearwardly of the furrow forming tool and in longitudinal alinement therewith, lifting and lowering means carried by the frame and operatively connected to said basin forming tool, means on an aforesaid wheel for operating said lifting and lowering means at intervals, and means connected between the basin forming tool and the beam for moving the basin forming tool rearwardly with respect to forward travel of the frame while being lifted.

5. In combination with an agricultural implement, a basin forming tool associated therewith, and lifting and lowering means for said tool, said means including substantially parallel links for moving said tool rearwardly with respect to forward travel of the implement while being lifted.

6. In combination with an agricultural implement, a basin forming device associated therewith, said device including a beam extending rearwardly from the implement, a basin forming tool movably carried by the beam, lifting and lowering means for said tool, and means for moving said tool rearwardly with respect to forward travel of the implement while being lifted, said means comprising a link connected between the tool and the beam.

7. In combination with an agricultural implement, a basin forming device including a beam connected to the implement, an arm pivotally connected to the beam, a shovel pivotally connected to the arm, lifting and lowering means for the shovel, and means for preventing said shovel from moving forwardly with respect to the implement while being lifted, said means comprising a link pivotally connected to the beam at a point spaced from the pivotal attachment of the arm thereto, said link being connected to the shovel at a point spaced from the pivotal attachment of the arm thereto.

8. In combination with an agricultural implement, a basin forming device including a beam connected to the implement, an arm pivotally connected to the beam, a shovel pivotally connected to the arm, lifting and lowering means for the shovel, and means for preventing said shovel from moving forwardly with respect to the implement while being lifted, said means comprising a link pivotally connected to the beam, said link being connected to the shovel at a point spaced from the pivotal attachment of the arm thereto.

9. In combination with a wheeled frame having a furrow forming tool and lifting and lowering means therefor, a basin forming tool associated with the frame, a separate lifting and lowering means for the basin forming tool, said lifting and lowering means including a rock-shaft and an arm thereon, a lug on a wheel for engaging said arm at intervals for actuating the second lifting and lowering means, and interconnecting means between the first and second lifting and lowering means for simultaneously lifting the furrow forming tool and the basin forming tool to transport position, said means simultaneously moving the aforesaid arm out of the path of the lug on the wheel for rendering the second lifting and lowering means inoperative.

10. In combination with an agricultural implement having a rotary ground engaging element and a furrow forming tool, a basin forming tool associated with the implement and disposed rearwardly of the furrow forming tool to follow in the furrow, lifting and lowering means for the basin forming tool, means operatively associated between the ground engaging element and said lifting and lowering means for alternately lifting and lowering said basin forming tool upwardly from and downwardly to the furrow and respectively rearwardly and forwardly with respect to the forward travel of the frame, a second lifting and lowering means on the implement for simultaneously lifting the furrow forming tool and the basin forming tool to transport position, means associated with the first and second lifting and lowering means for interrupting the operative association between the ground engaging element and the first lifting and lowering means when the basin forming tool is in said transport position, and means associated with the first and second lifting and lowering means for interrupting the operative association between the ground engaging element and the first lifting and lowering means when the basin forming tool is in said transport position.

11. In combination with an agricultural implement, a basin forming tool associated therewith for movement rearwardly and upwardly with respect thereto, and power actuated lifting and lowering means carried by the implement and operatively connected to the tool for lifting and lowering said tool at intervals according to the forward travel of the implement, said lifting and lowering means including substantially parallel links for substantially simultaneously moving said tool substantially longitudinally rearwardly with respect to the forward travel of the implement and substantially vertically upwardly from the basin formed thereby.

FRANK THOMPSON.